Figure 1:
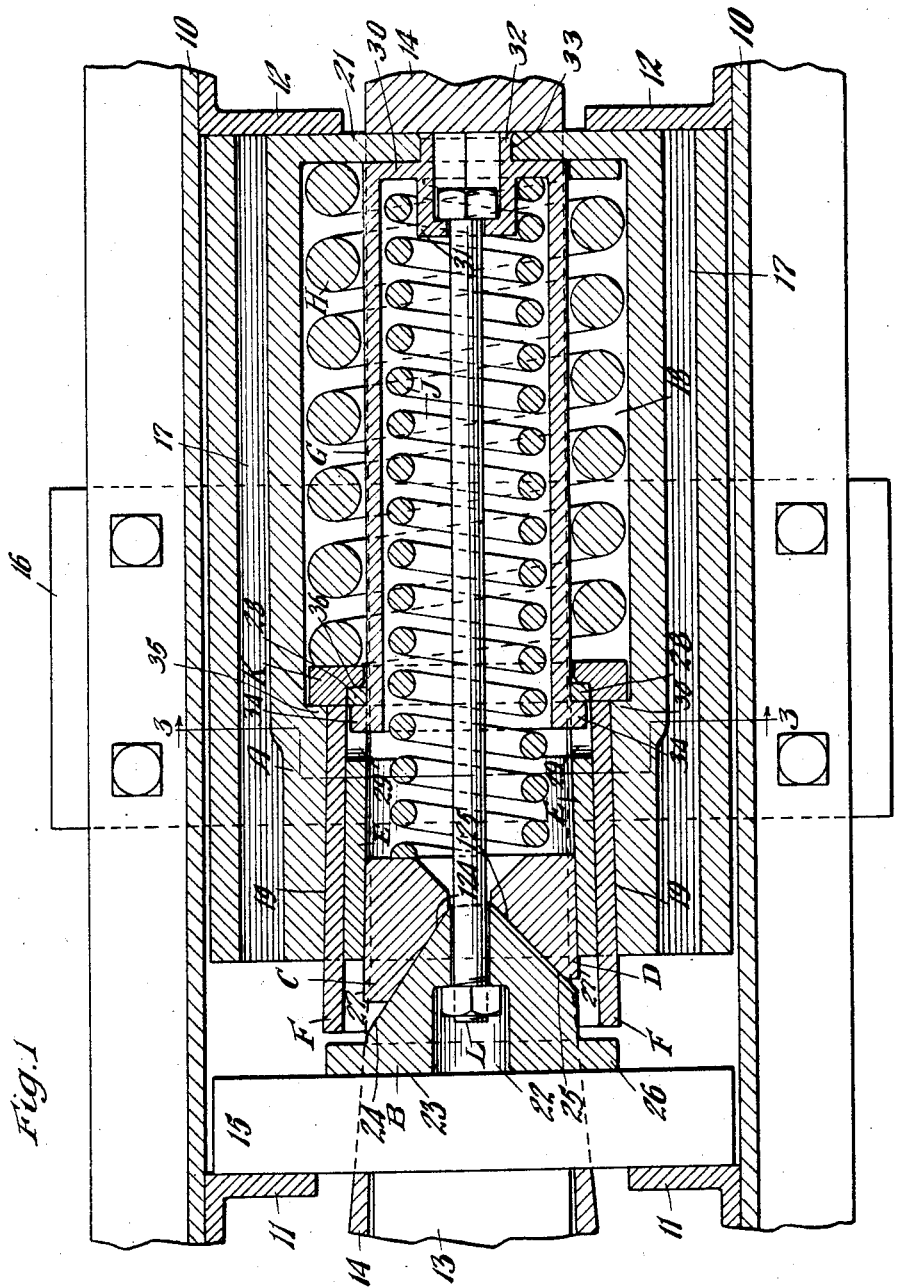

June 7, 1927.

J. F. O'CONNOR 1,631,148

FRICTION SHOCK ABSORBING MECHANISM

Filed May 7, 1925

2 Sheets-Sheet 1

Witness
Wm. Geiger

Inventor
John F. O'Connor
By George I. Haight
His Atty.

June 7, 1927.
J. F. O'CONNOR
1,631,148
FRICTION SHOCK ABSORBING MECHANISM
Filed May 7, 1925  2 Sheets-Sheet 2
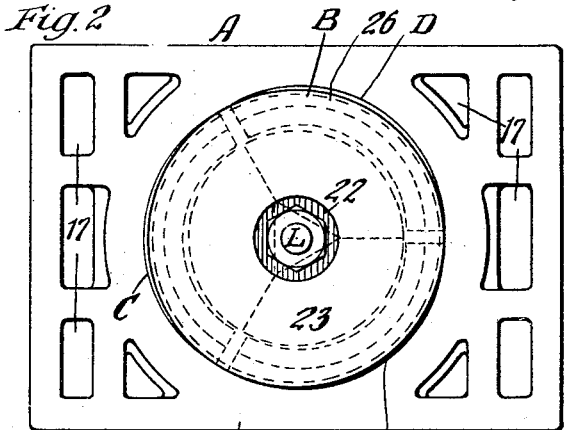
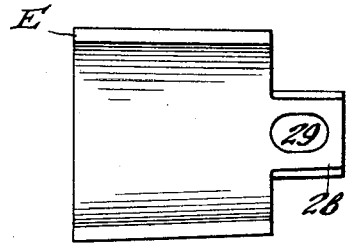
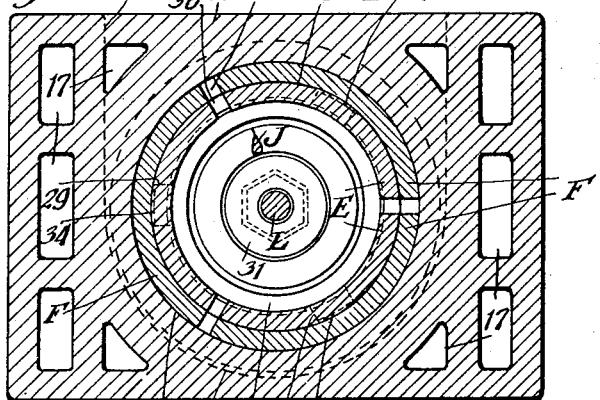
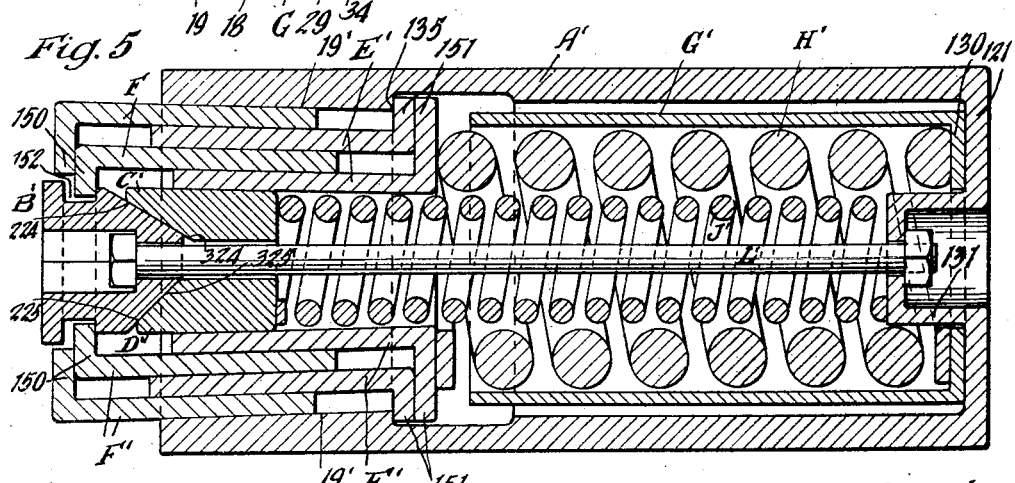
Witness
Wm. Geiger
Inventor.
John F. O'Connor
By George D Haight
His Atty.

Patented June 7, 1927.

1,631,148

UNITED STATES PATENT OFFICE.

JOHN F. O'CONNOR, OF CHICAGO, ILLINOIS, ASSIGNOR TO W. H. MINER, INC., OF CHICAGO, ILLINOIS, A CORPORATION OF DELAWARE.

FRICTION SHOCK-ABSORBING MECHANISM.

Application filed May 7, 1925. Serial No. 28,534.

This invention relates to improvements in friction shock absorbing mechanism.

One object of the invention is to provide a friction shock absorbing mechanism, especially adapted for railway draft riggings having graduated action during the compression stroke, including heavy final resistance produced by a plurality of relatively movable friction elements.

Another object of the invention is to provide a mechanism of the character indicated, having high capacity, including a friction element and a plurality of co-operating curved friction plates, wherein the resistance progressively increases during the compression stroke.

Still another object of the invention is to provide a friction shock absorbing mechanism, including a plurality of relatively movable friction plates, wherein all of the plates are movable as a unit during a predetermined portion of the compression stroke to effect relatively light resistance followed by a relative movement of the plates to increase the resistance offered, certain of said plates being engaged by a stop column member to arrest their movement and permit movement of the remaining plates relatively thereto.

Other objects and advantages of the invention will more fully and clearly appear from the description and claims hereinafter following.

In the drawing forming a part of this specification, Figure 1 is a longitudinal, sectional view of a railway draft rigging, showing my improvements in connection therewith, the section through the friction shell and friction elements therewithin being taken on two section planes 120° apart. Figure 2 is a front end elevational view of the shock absorbing mechanism proper. Figure 3 is a vertical, transverse, sectional view corresponding substantially to the line 3—3 of Figure 1. Figure 4 is a side elevational view of a friction plate used in connection with my improved mechanism. And Figure 5 is a longitudinal, sectional view of a different embodiment of the invention illustrated in Figures 1 to 4, inclusive, the section through the friction shell and friction wedge elements corresponding to two section planes 120° apart.

In said drawings, 10—10 indicate channel-shaped center or draft sills of a railway car underframe, to the inner faces of which are secured front stop lugs 11—11 and rear stop lugs 12—12. The inner end portion of the drawbar is indicated at 13, to which is operatively connected a hooded yoke 14 of well-known form. The shock absorbing mechanism proper, hereinafter more fully described, and a front main follower 15 are disposed within the yoke, the yoke in turn being operatively supported by a detachable saddle plate 16.

Referring first to the embodiment of my invention as illustrated in Figures 1 to 4, inclusive, my improved shock absorbing mechanism comprises broadly, a combined friction shell and spring cage A; a main wedge B; three friction shoes C, D and D; two sets of friction plates E and F; a stop column element G; a heavy main spring resistance H; a relatively lighter spring resistance J; a spring follower ring K; and a retainer bolt L.

The combined friction shell and spring cage is in the form of a relatively heavy casting of generally rectangular outline suitably cored as indicated at 17—17. The casting A has the spring cage section formed at the inner end thereof, the casting being provided with a relatively large longitudinal cylindrical bore 18 adapted to accommodate the spring resistance elements. At the forward end, the casting is formed with a friction shell section, having three inwardly converging interior true cylindrical friction surfaces 19—19. The cylindrical surfaces 19—19 are preferably so disposed that the coalesce at the inner end of the friction shell to form a complete true circle. As shown in Figure 1, the friction shell opening is of smaller diameter than the bore 18 which accommodates the main spring resistance elements. The casting is left open at the top as indicated at 20 to permit lateral insertion of the main spring resistance element and spring follower ring when the mechanism is being assembled. At the rear end, the spring cage has a transverse end wall 21 co-operating with the rear stop lugs 12 in the manner of the usual rear follower.

The main wedge B is in the form of a relatively heavy cast block suitably cored as indicated at 22. The block B has a flat transverse front end face 23 adapted to co-operate with the inner face of the main follower 15. At the inner end, the block B has three rearwardly converging wedge faces 24, 25 and 25, the three faces being symmetrically arranged about the axis of the mechanism. The faces 25—25 are disposed at a relatively blunt angle with reference to the longitudinal axis of the mechanism, while the face 24 is disposed at a relatively keen wedge-acting angle with reference to said axis. As most clearly shown in Figure 1, the wedge block B has a continuous annular flange 26 laterally projecting therefrom for a purpose hereinafter more fully described.

The three friction shoes C, D and D are of like design, except as hereinafter pointed out. Each of the shoes C, D and D has a longitudinally disposed outer true cylindrical friction surface 27 adapted to co-operate with one of the friction plates of the set E. On the inner side, at the forward end thereof, the shoe C has a wedge face 124 correspondingly inclined to and adapted to co-operate with the wedge face 24 of the wedge block B. The shoes D are also provided with inner wedge faces at the forward end thereof, the same being indicated by 125. The faces 125 of the two shoes D co-operate with the faces 25 of the wedge block B, being correspondingly inclined thereto. It will be evident that the shoe D and D have their wedge faces 125 disposed at relatively blunt angles with reference to the longitudinal axis of the mechanism while the shoes C has the wedge face thereof disposed at a relatively keen wedge-acting angle with reference to said axis.

The two sets of friction plates E and F are interposed between the friction wedge shoes and the friction surfaces 19 of the friction shell. As most clearly shown in Figures 1, 2 and 3, the friction plates of the two sets are arranged in annular series, each set comprising three plates. The three plates E are all of like design, each plate being curved in cross-section and having outer and inner true cylindrical friction surfaces, the inner friction surfaces thereof co-operating with the friction surfaces 27 of the shoes. As most clearly shown in Figure 4, each plate E has a rearward extension 28 provided with a longitudinal, relatively short opening 29 for a purpose hereinafter described.

The friction plates F which are three in number, are also of like design. Each plate F is curved in transverse section and has inner and outer true cylindrical friction surfaces adapted to co-operate respectively with the outer friction surface of one of the plates E and the corresponding friction surface 19 of the shell. The plates F are longer than the plates E and in the normal position of the parts extend outwardly beyond the plates E and project beyond the front end of the friction shell.

The stop column element G is of cylindrical form, having a transverse inner end wall 30 adapted to abut the inner surface of the transverse end wall 21 of the casting A. On the inner side of the wall 30 is a cylindrical hollow boss 31 and on the outer side, said wall is provided with an annular flange 32 accommodated within an opening 33 in the end wall 21 of the casting A. The outer end of the annular flange 32 is upset as shown in Figure 1, whereby the column G is fixedly secured to the casting A. At the forward end, the column has three radially projecting exterior lugs 34, each lug 34 being adapted to work within the opening 29 of the corresponding friction plate E. It will be evident that the plates E are anchored to the column G for limited relative movement, inward movement of the plates being limited by engagement of the lugs 34 with the outer end walls of the openings 29 and outward movement of the plates being limited by engagement of said lugs with the inner end walls of the openings.

The main spring resistance element H which is in the form of a relatively heavy coil is disposed within the bore 18 of the spring cage and surrounds the cylindrical column member G, having its rear end bearing on the end wall 21 of the casting A and its forward end bearing on the inner side of the spring follower ring K.

The spring follower K which is in the form of a relatively heavy annulus, has its outer face bearing on the inner ends of the friction plates F and an annular shoulder 35 between the friction shell section and the spring cage section of the casting A. The opening of the ring is of such a size as to freely accommodate the tubular stop column element G. The wall of the opening of the ring is cut away at the forward side, thereby providing an annular groove 36 adapted to accommodate the inner ends of the extensions 28 of the friction plates E.

The spring resistance element J which is in the form of a relatively light coil, is disposed within the stop column G and has its opposite ends bearing respectively on the transverse end wall 30 of said column and the inner ends of the friction shoes. In this connection, it is pointed out that the spring J is longer than the spring H and projects outwardly beyond the front end of the stop column G.

The retainer bolt L has its front and rear ends anchored respectively to the wedge B and the hollow boss 31 of the column G, the nut of the bolt being accommodated within the opening of the wedge block and the head within the hollow boss of the stop column.

In assembling the mechanism, the spring H and the spring follower ring K are inserted through the opening at the top of the casting A. The stop column G with the plates E anchored thereto is then telescoped within the spring resistance H and fixed to the casting A by upsetting the annular flange 32 within the opening 33. The friction plates F, the spring resistance J, wedge shoes and wedge are then assembled and anchored by the retainer bolt L.

The parts are preferably so arranged and proportioned that the retainer bolt L maintains the mechanism of uniform overall length and holds the spring J under initial compression. The spring H is also preferably held under initial compression by the spring follower ring K which is in abutment with the shoulder 35 of the casting A.

The normal position of the parts is that shown in Figure 1, wherein the friction plates F are shown as having their outer ends spaced from the annular flange 26 of the wedge block B. The friction plates E are also in their outermost position as shown, the inner end walls of the openings 29 being engaged by the lugs 34 of the stop column G and the outer end walls of said opening being spaced a predetermined distance, as shown, from said lugs.

The operation of my improved shock absorbing mechanism during a compression stroke is as follows: The follower 15 and the casting A move relatively toward each other forcing the wedge B and the friction shoes C inwardly of the shell, compressing the spring resistance J. At this time there will be a lateral spreading action set up between the wedge and shoes, said lateral pressure being transmitted to the friction plates E and F, bringing the friction surfaces thereof into intimate contact and pressing the friction plates F against the friction surfaces of the shell. During the initial rearward movement of the wedge and friction shoes, the latter will slip on the plates E, compressing the spring J, the two sets of plates E and F being yieldingly held in outermost position by the spring H. Due to the converging relation of the friction surfaces of the shell and the corresponding converging relation of the inner surfaces of the plates E, there will be a lateral inward movement of the friction shoes toward the axis of the mechanism, during the compression stroke, slippage occurring on the co-acting blunt faces of the shoes and wedge. This action will continue until the clearance between the flange 26 of the wedge B and the plates F is taken up, whereupon the plates F will be moved inwardly, carrying therewith the plates E and compressing the spring H. Movement of the plates E continues until the front end walls of the openings 29 of the plates E come into abutment with the lugs 34 of the stop column G, whereupon further inward movement of the friction plates E will be arrested, the friction shoes slipping inwardly on the friction surfaces of the same and the plates F also slipping on the plates E. Inasmuch as the plates E and F are moved relatively to each other and the shoes also slide inwardly on the friction surface of the now stationary plates E, the frictional resistance will be greatly augmented during the further compression of the mechanism. This action will continue until the actuating force is reduced or the front follower 15 abuts the outer end of the casting A, whereupon the actuating force will be transmitted directly through the casting to the stop lugs of the draft sills, relieving the springs of excessive strain and preventing the same from being driven solid. It will be evident that there will be substantially no wedging action between the blunt faces of the wedges and the corresponding shoes while a true wedging action will be effected between the co-operating keen faces of the wedge and the shoes C. Due to the wedging action, there will be a slight expansion of the shell, thereby storing up energy therein, whereby the shell will forcibly contract when the actuating pressure is removed, creating lateral inward pressure on the blunt faced shoes and facilitating release of the main wedge due to the releasing angle of the co-operating wedge faces of the main wedge and the shoes D.

By the embodiment of the blunt and keen sets of wedge faces, I am enabled to obtain a very high wedging action during the compression stroke, since the keen wedge faces may be relatively acute without danger of the parts sticking, the blunt wedge faces acting more or less as "safety valves". In this connection, it will be understood by those skilled in the art that my improvements are capable of use in a mechanism either employing a blunt and keen angle system of wedge faces or wedge faces which are all of the same angle with respect to the axis of the mechanism.

In release, the springs H and J effectively restore all of the parts to normal position, the spring J which bears directly on the wedge friction shoes being free to release the latter prior to relative movement of the friction plates and movement of these plates with reference to the friction shell. Due to the friction existing between the plates, the plates E will be carried outwardly with the plates F until arrested by the lugs 34 on the stop column G.

Referring next to the embodiment of the invention illustrated in Figure 5, the improved shock absorbing mechanism comprises broadly as shown, a friction shell and spring cage casting A'; a main wedge B'; three friction shoes C' D' and D'; two sets of friction plates E' and F'; a stop column element G'; a heavy main spring resistance H'; a relatively lighter spring resistance J'; and a retainer bolt L'. The friction shell A' is substantially the same design as the shell A of the preferred embodiment of the invention, being also rectangular in form, but not being open at the top as is the casting A. The inner end of the casting A' provides the spring cage section, while the forward end provides the friction shell. The friction shell section of the casting has three interior rearwardly converging true cylindrical friction surfaces 19'—19' with which co-operate the outermost of the said friction plates F', these plates being provided with true cylindrical friction surfaces co-operating with the friction surfaces 19'.

As shown in Figure 5, the two sets of friction plates E' and F' are interposed between the wedge shoes C', D' and D' and the friction shell, the wedge shoes C' being provided with a relatively keen wedge face 224 co-operating with the corresponding wedge faces 324 on the main wedge B', the shoes D' each having relatively blunt wedge faces 225 co-operating with corresponding blunt wedge faces 325 on the wedge B'. Each set of friction plates F' comprises two annular series of three plates each, and each set of friction plates E similarly comprises two annular series of three plates each, the plates E' of said two series being alternated with the two series of plates F'. The plates F' are of like construction, each being of curved cross-section and having an annular inwardly projecting flange 150 at the forward end thereof, the flanges 150 of the outer series of plates being longer than the corresponding flanges of the inner series. The plates E' are also of curved transverse section, and have annular flanges 151 at the inner ends thereof, the flanges of the innermost plates being of such a length that they overlap the corresponding flanges 151 of the outer series of plates E'.

In the form of the invention illustrated in Figure 5, the stop column element G' is in the form of a relatively large cylinder, having a transverse end wall 130 abutting the inner surface of the transverse end wall 121 of the casting A', both the heavy spring resistance H' and the relatively light spring J' being disposed within the stop column G'. The heavy spring H' is interposed between the transverse end wall of the stop column and the flanges 151 of the innermost plates E'. Expansion of the spring H' is limited by engagement with the flanges of the latter plates, which in turn, abut the flanges 151 of the inner series of plates E', the flanges of the latter abutting an annular shoulder 135 at the inner end of the friction shell. The light coil J' has its front and rear ends bearing respectively on the inner ends of the friction shoes and a hollow boss 131 extending inwardly from the transverse end wall 121 of the casting A. The spring H' holds the stop column seated against the transverse end wall 121 of the casting A and the boss 131 is loosely accommodated within the opening of the transverse end wall 130 of the stop column G'.

In the normal position of the parts, the wedge block B' projects outwardly beyond the front ends of the outer series of friction plates F' and the main front follower, not shown in Figure 5, is spaced a slight distance from the flanges 150 of said plates to provide for preliminary movement. A space is also left between the front end of the stop column G' and the flanges 151 on the innermost plates E' to permit a predetermined amount of relative movement between the two series of plates E' and the column.

The operation of the device illustrated in Figure 5 is substantially the same as that of the form of the invention illustrated in Figures 1 to 4 inclusive, hereinbefore described, the friction shoes moving relatively to the plates E' during initial action until the plates F' are engaged by the main follower, whereupon the plates F' and E' will be moved in unison with the friction wedge system until the plates E' are arrested by engagement with the stop column G'. The friction wedge system will then move relatively to the now stationary plates E' and the plates F' will also be moved relatively to the plates E'. This action will continue until the mechanism is fully compressed. Upon reduction of the actuating force, the plates will all be restored to normal position by the springs H' and J'. The friction plates F' are positively restored to normal position by the wedge block B', the latter being provided with an annular groove 152 within which engages the lateral flanges 150 of the innermost series of friction plates F', the groove 152 being of sufficiently greater width than the flanges 150 of these plates to permit for the necessary relative movement between the wedge B' and the plates to allow the main follower to engage the flanges 150 of the outer series of friction plates F' during compression of the mechanism. The outer series of plates F' will be carried outwardly in unison with the inner series of plates F', the flanges 150 of the former being adapted to be engaged by the outer ends of the latter. The spring H' and J' are held under initial compression and the mechanism is maintained of uniform overall length by the retainer bolt J' anchored respectively to the casting A' and the main wedge B'.

While I have herein shown and described what I now consider the preferred manner of carrying out my invention, the same is merely illustrative, and I contemplate all changes and modifications that come within the scope of the claims appended hereto.

I claim:

1. In a friction shock absorbing mechanism, the combination with column-load-sustaining member; of a plurality of friction elements disposed at one end of said member, all of said elements being movable as a unit during a predetermined portion of the compression stroke; means co-operating with the other end of said member for arresting movement of certain of said elements after a predetermined compression of the mechanism and permitting the remaining friction elements to be moved relatively thereto; a follower, said follower and members being movable relatively toward and from each other; combined restoring and cushioning spring means; and lateral pressure creating means co-operating with said friction elements for pressing the same into intimate frictional contact upon relative approach of said follower and member.

2. In a friction shock absorbing mechanism, the combination with a column load sustaining member; of a plurality of relatively movable friction plates, all of said plates being movable as a unit during a predetermined portion of the compression stroke; means for arresting movement of certain of said plates prior to complete compression of the mechanism and thereby compelling relative movement of said plates during the remainder of said stroke; a lateral pressure creating friction system co-operating with said plates; a follower, said follower and member being relatively movable toward and from each other; a main spring resistance co-operating with said plates; and a second spring resistance co-operating with said friction system, said last named spring being of a length at least equal to said main spring resistance.

3. In a friction shock absorbing mechanism, the combination with a column load-sustaining member having friction surfaces adjacent one end thereof; abutment means at the opposite end of said column member; a follower, said follower and member being movable relatively toward and from each other; a plurality of relatively movable friction elements co-operating with the column member, said elements being movable in unison during a predetermined portion of the compression stroke; means for arresting movement of certain of said elements to compel relative movement of said elements; a main spring resistance; a second spring resistance, said last named spring resistance cooperating with said abutment means; and lateral pressure creating means co-operating with said friction elements, said last named means being restored by said second named spring resistance.

4. In a friction shock absorbing mechanism, the combination with a column load-sustaining member; of a follower, said member and follower being movable relatively toward and from each other; a plurality of relatively movable friction elements movable as a unit during relative movement of said member and follower during a predetermined compression of the mechanism; a second column member for arresting movement of certain of said elements after said predetermined compression to compel the remaining elements to move relatively thereto; a main spring resistance; and lateral pressure-creating means co-operating with said elements to place them under lateral pressure upon relative movement of said follower and column load-sustaining member, said lateral pressure-creating means also having engagement with the remaining elements to effect movement thereof with reference to the column-load-sustaining member.

5. In a friction shock absorbing mechanism, the combination with a column load-sustaining member; of a pressure-transmitting element having wedge means associated therewith, said element and member being movable relatively toward and from each other; friction-shoes co-operating with said wedge means; a plurality of relatively movable friction plates movable as a unit during relative movement of said member and element during a predetermined compression of the mechanism; a second column member for arresting movement of certain of said plates after said predetermined compression to compel relative movement of said friction shoes and last named plates; abutment means on said pressure-transmitting element normally spaced from the remaining plates adapted to engage the same after a predetermined relative movement of said shoes and plates to effect relative movement of said plates during the remainder of the compression stroke; and means yieldingly opposing movement of said plates and friction shoes.

6. In a friction shock absorbing mechanism, the combination with a friction shell having interior friction surfaces; of a plurality of curved friction plates within said friction shell, all of said plates, as a unit, being adapted for bodily movement relative to said shell for a limited distance during a compression stroke; lateral-wedge-pressure creating means associated with said plates, said means being movable relatively to said member; means for arresting movement of certain of said friction plates at a predetermined point in the compression stroke of the mechanism for thereafter permitting movement of the remaining plates relatively thereto; and spring resistance means associated with said pressure means and plates.

7. In a friction shock absorbing mechanism, the combination with a friction shell; of a set of curved friction plates within the shell and adapted for a limited amount of movement relative to said shell during a compression stroke; a second set of curved friction plates co-operating frictionally with said first named set and also movable longitudinally relatively to said shell, the outer ends of the plates of the second set normally projecting outwardly beyond the outer ends of the plates of the first set; lateral wedge pressure creating means operatively associated with said plates of the two sets; and spring resistance means operatively associated with said pressure means and plates.

8. In a friction shock absorbing mechanism, the combination with a follower; of follower acting means comprising a combined spring cage and friction shell, said shell having interior curved friction surfaces, said follower and follwer acting means being relatively movable toward and away from each other; a series of curved friction plates co-operating with said shell friction surfaces, said plates and shell being relatively movable; a second series of curved friction plates co-operating with said first named plates, said last named plates having limited movement with reference to the shell; lateral wedge-pressure-creating means operatively associated with said plates and co-operating with said follower; and spring resistance means operatively associated with said pressure means and plates.

9. In a friction shock absorbing mechanism, the combination with a friction shell having inwardly converging fricton surfaces; two sets of curved friction plates, the plates of one set frictionally co-operating with the plates of the other set, one of said sets of plates having limited movement with reference to the shell; column means for arresting movement of said last named set of plates to compel movement of the other set with reference thereto; lateral pressure creating means operatively associated with said plates; and spring resistance means operatively associated with said pressure means and plates.

10. In a friction shock absorbing mechanism, the combination with a friction shell having interior curved friction surfaces; of a series of curved friction plates cooperating with the shell friction surfaces and movable relatively to the shell; a second series of curved friction plates co-operating with said first series, said last named plates and shell having limited relative movement; means for arresting movement of said last named plates after a predetermined compression of the mechanism; lateral pressure creating means co-operating with said plates; a main spring resistance operatively associated with said first named series of plates; and a second spring resistance co-operating with said lateral pressure-creating system.

11. In a friction shock absorbing mechanism, the combination with a friction shell having interior friction surfaces; of an annular series of friction plates co-operating with the friction surfaces of the shell, said plates and shell being relatively movable; a second annular series of friction plates co-operating with said first named plates, said last named plates and shell having limited relative movement; a column element for limiting relative movement of said last named series of plates and shell after a predermined compression of the mechanism; a lateral wedge pressure creating friction system co-operating with said last named series of plates; a main spring resistance co-operating with said two series of plates; and a second spring co-operating with said wedge pressure creating system, said last named spring being disposed within said column element.

12. In a friction shock absorbing mechanism, the combination with front and rear stops; of a combined friction shell and spring cage co-operating with certain of said stops; a main follower co-operating with the remaining stops; a yoke co-operating with said combined spring cage and friction shell and main follower; annular sets of friction plates within said shell, certain of said plates having limited longitudinal movement with reference to the shell; means for arresting movement of said last named plates after a predetermined compression of the mechanism, the remaining plates being thereafter movable with reference to the shell and said arrested plates; wedge-pressure-creating means for placing said annular sets of plates under lateral pressure; and spring resistance means operatively associated with said wedge-pressure creating means and plates.

13. In a friction shock absorbing mechanism, the combination with a friction shell having inwardly converging friction surfaces; a pressure-transmitting means having abutment means associated therewith, said pressure transmitting means and shell being relatively movable toward and from each other; sets of friction plates within the shell, one of said sets being engaged by said abutment means and movable in unison with said pressure-transmitting means and the remaining set having limited movement inwardly of the shell simultaneously with the other plates; lateral pressure creating means co-operating with said sets of plates, said pressure-creating means including a wedge element and friction shoes engaging the innermost of said plates and said sets, said shoes and wedge having co-operating sets of wedge faces, certain of said co-operating sets of faces being disposed at a keen wedge-acting angle with reference to the longitudinal axis of the mechanism and the remaining co-operating sets being disposed at a relatively blunt angle with reference to said axis; means for arresting movement of said remaining sets of plates after a predetermined compression of the mechanism; and spring resistance means operatively associated with said lateral pressure-creating means and plates.

14. In a friction shock absorbing mechanism, the combination with a column load sustaining member; of follower acting means, said means and column member being movable relatively toward and from each other; a plurality of intercalated relatively movable curved friction plates, the plates being arranged in two sets, each set comprising a plurality of plates, all of said plates being movable as a unit during relative movement of said member and follower means; means for arresting movement of certain of said plates after a predetermined portion of the compression stroke to compel the remaining plates to move relatively thereto; a combined restoring and cushioning spring resistance; and lateral pressure creating means co-operating with said plates to place them under lateral pressure upon relative movement of said follower means and member.

15. In a friction shock absorbing mechanism, the combination with a friction shell having interior curved friction surfaces; of a follower, said shell and follower being movable relatively toward and from each other; a plurality of relatively movable curved friction plates within the shell, said plates comprising two sets, each composed of a plurality of plates, all of said sets of plates being movable as a unit during relative movement of said member and follower; means for arresting movement of certain of said plates after a predetermined portion of the compression stroke to compel the remaining plates to move relatively thereto; a main spring resistance; and lateral pressure creating means co-operating with said plates to place them under lateral pressure upon relative movement of said follower and shell, said lateral pressure creating means also having engagement with said remaining plates to effect movement thereof with reference to the friction shell.

16. In a friction shock absorbing mechanism, the combination with front and rear stops; of a combined spring cage and friction shell co-operating with certain of said stops; a main follower co-operating with the remaining stops; a yoke co-operating with said combined spring cage and friction shell and main follower; a plurality of curved, friction plates within the friction shell, said plates comprising two relatively movable sets, one of said sets having limited movement with reference to the shell; lateral wedge-pressure creating means co-operating with said main follower for placing said plates under lateral pressure, said means including a pair of said sets; and a main spring resisting inward movement of said elements.

In witness that I claim the foregoing I have hereunto subscribed my name this 4th day of May, 1925.

JOHN F. O'CONNOR.